(12) United States Patent
Berggren

(10) Patent No.: US 7,426,923 B2
(45) Date of Patent: Sep. 23, 2008

(54) EXHAUST GAS RECIRCULATION SYSTEM FOR GASOLINE ENGINES

(75) Inventor: Gustav Berggren, Stockholm (SE)

(73) Assignee: Haldex Hydraulics AB (SE)

( * ) Notice: Subject to any disclaimer, the term of this patent is extended or adjusted under 35 U.S.C. 154(b) by 8 days.

(21) Appl. No.: 11/533,035

(22) Filed: Sep. 19, 2006

(65) Prior Publication Data

US 2008/0066725 A1    Mar. 20, 2008

(51) Int. Cl.
  *F02M 25/07*   (2006.01)
  *F02B 47/08*   (2006.01)
(52) U.S. Cl. .............................. 123/568.18; 123/568.17
(58) Field of Classification Search ............ 123/568.11, 123/568.12, 568.15, 568.17, 568.18, 568.19, 123/568.2; 60/605.2
See application file for complete search history.

(56) References Cited

U.S. PATENT DOCUMENTS

| | | | | |
|---|---|---|---|---|
| 4,174,027 | A |   | 11/1979 | Nakazumi ................. 192/0.084 |
| 4,224,912 | A |   | 9/1980 | Tanaka ........................ 123/568 |
| 4,329,965 | A | * | 5/1982 | Ueda et al. .............. 123/568.18 |
| 5,325,828 | A | * | 7/1994 | Yamaguchi et al. .... 123/568.15 |
| 6,152,115 | A | * | 11/2000 | Busato et al. ........... 123/568.17 |
| 7,036,529 | B2 | * | 5/2006 | Berggren et al. ....... 123/568.17 |
| 7,207,324 | B2 | * | 4/2007 | Kuhnel et al. .......... 123/568.12 |
| 7,252,077 | B2 | * | 8/2007 | Berggren ................ 123/568.17 |
| 7,261,096 | B2 | * | 8/2007 | Berggren et al. ....... 123/568.18 |
| 2006/0180224 | A1 | * | 8/2006 | Berggren et al. ....... 123/568.17 |

FOREIGN PATENT DOCUMENTS

WO  WO 01/00981   1/2001
WO  WO 02/18773   3/2002

OTHER PUBLICATIONS

Michihiko Tabata, Toshihide Yamamoto, and Tugio Fukube; "Improving NOx and Fuel Economy for Mixture Injected SI Engine with EGR"; International Congress and Exposition; Feb. 27-Mar. 2, 1995; SAE Technical Paper Series 950684.

S. Diana, V. Giglio, B. Iorio and G. Police; "A Strategy to Improve the Efficiency of Stoichiometric Spark Ignition Engines"; International Fall Fuels& Lubricants Meeting & Exposition; Oct. 14-17, 1996; SAE Technical Paper Series 961953.

Grant Lumsden, David Eddleston and Richard Sykes; "Comparing Lean Burn and EGR"; International Congress & Exposition; Feb. 24-27, 1997; SAE Technical Paper Series 970505.

(Continued)

*Primary Examiner*—Willis R Wolfe, Jr.
(74) *Attorney, Agent, or Firm*—St. Onge Steward Johnston & Reens LLC

(57) ABSTRACT

A gasoline engine system includes a gasoline engine, a throttle valve for metering a supply of combustion gas fed to the engine, and a source of metered fuel injected into the combustion gas mixture. The throttle valve includes an inlet air supply line, a recirculating exhaust gas supply line, and an output line. Air entering through the inlet air supply line and exhaust gas entering though the recirculating exhaust gas supply line mix to create a combustion gas mixture of air, fuel and exhaust gas before exiting the output line. A body is actuatable to control a proportion of air versus recirculating exhaust gas in the combustion gas mixture.

33 Claims, 6 Drawing Sheets

OTHER PUBLICATIONS

Börje Grandin and Hans-Erik Ångström, Per Stålhammar and Eric Olofsson; "Knock Suppression in a Turbocharged SI Engine by Using Cooled EGR"; International Fall Fuels & Lubricants Meeting & Exposition; Oct. 19-22, 1998; SAE Technical Paper Series 982476.

Börje Grandin and Hans-Erik Ångström; "Replacing Fuel Enrichment in a Turbo Charged SI Engine: Lean Burn or Cooled EGR"; International Fall Fuels & Lubricants Meeting & Exposition; Oct. 25-28, 1999; SAE Technical Paper Series 199-01-3505.

Yorick Duchaussoy, Alain Lefebvre and Robert Bonetto; "Dilution Interest on Turbocharged SI Engine Combustion"; 2003 SAE World Congress; Mar. 3-6, 2003; SAE Technical Paper Series 2003-01-0629.

* cited by examiner

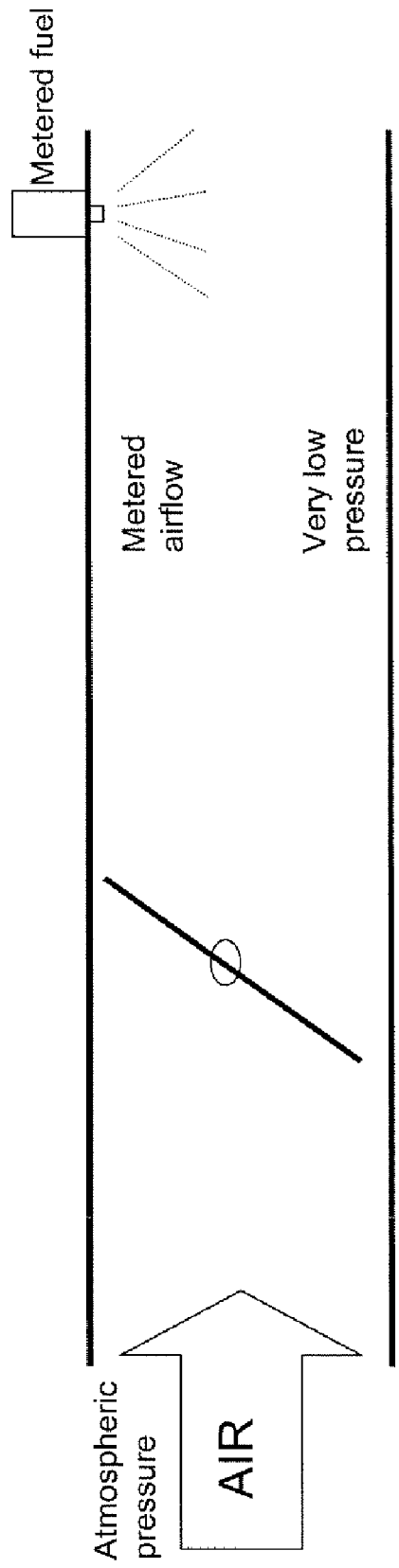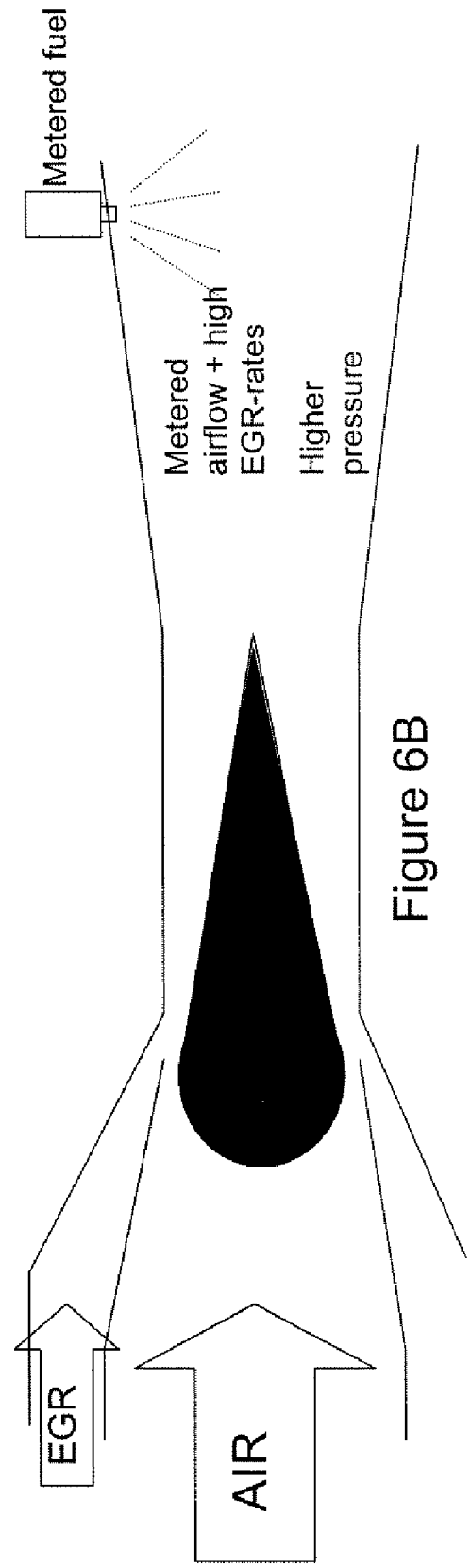
Figure 6A (prior art)
Figure 6B

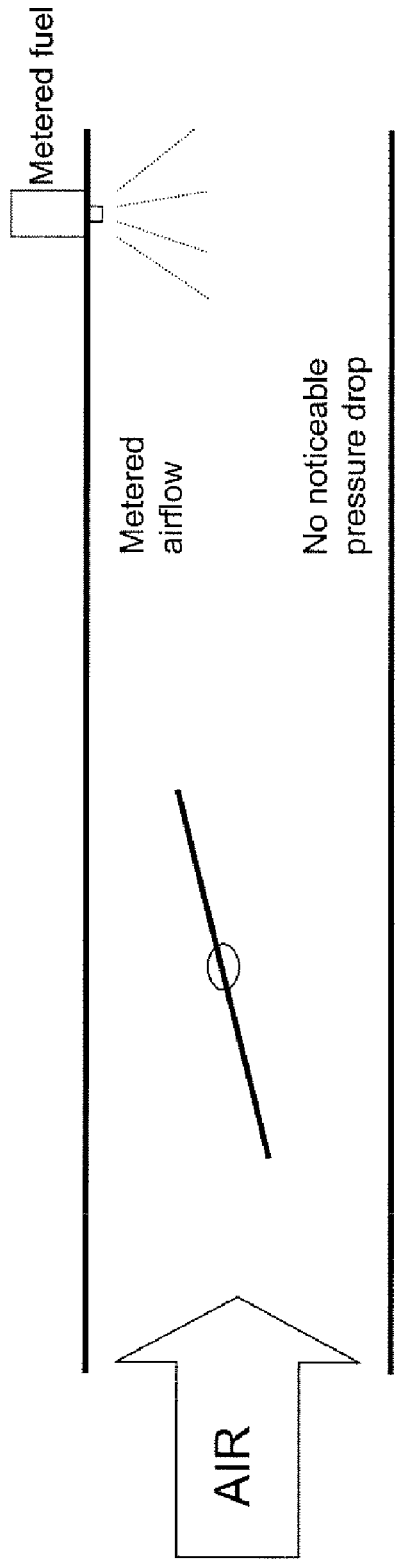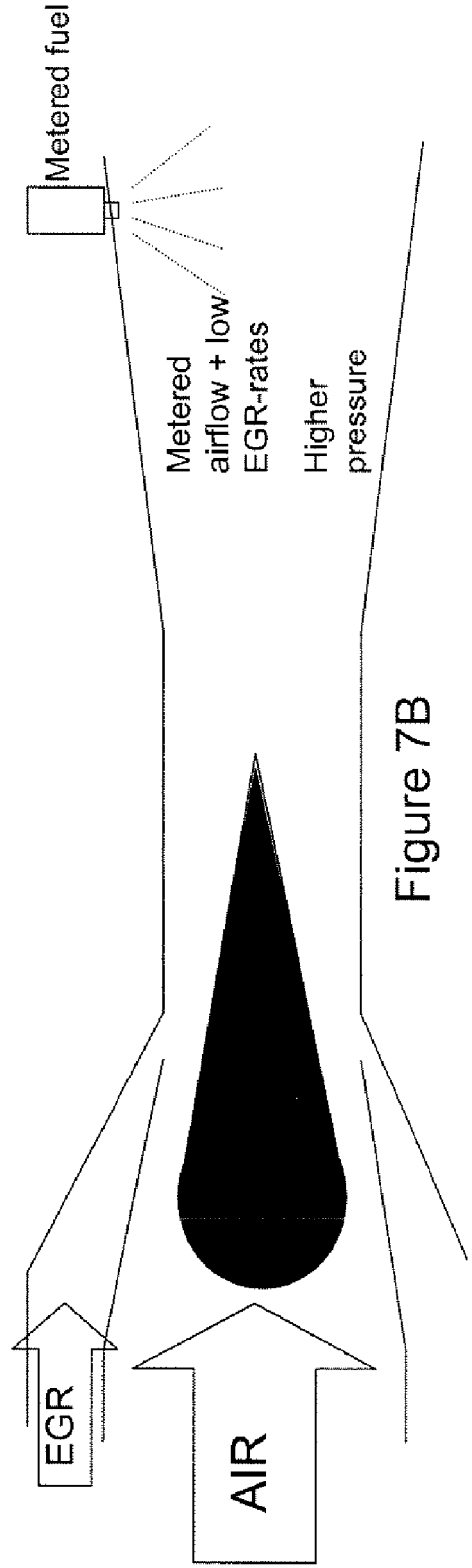
Figure 7A (prior art)
Figure 7B

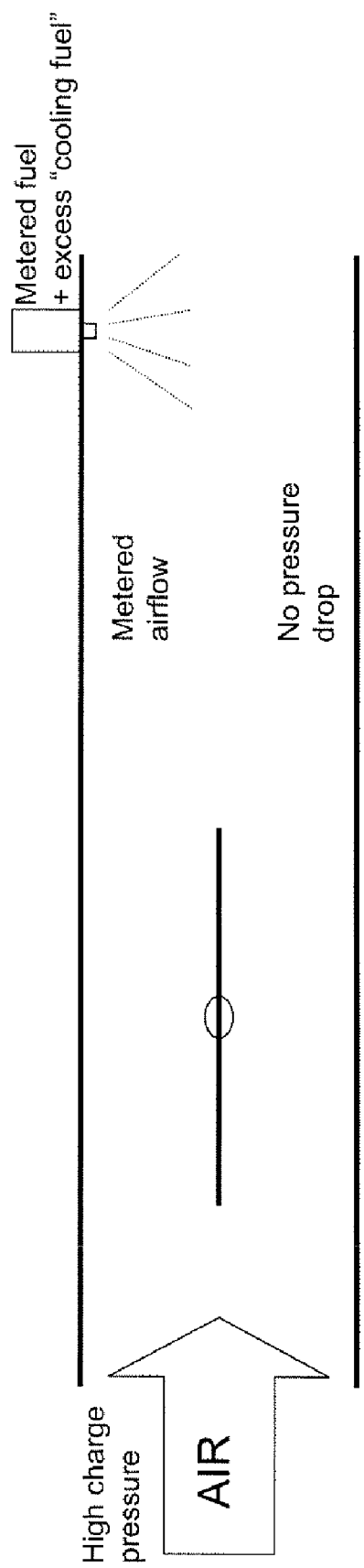
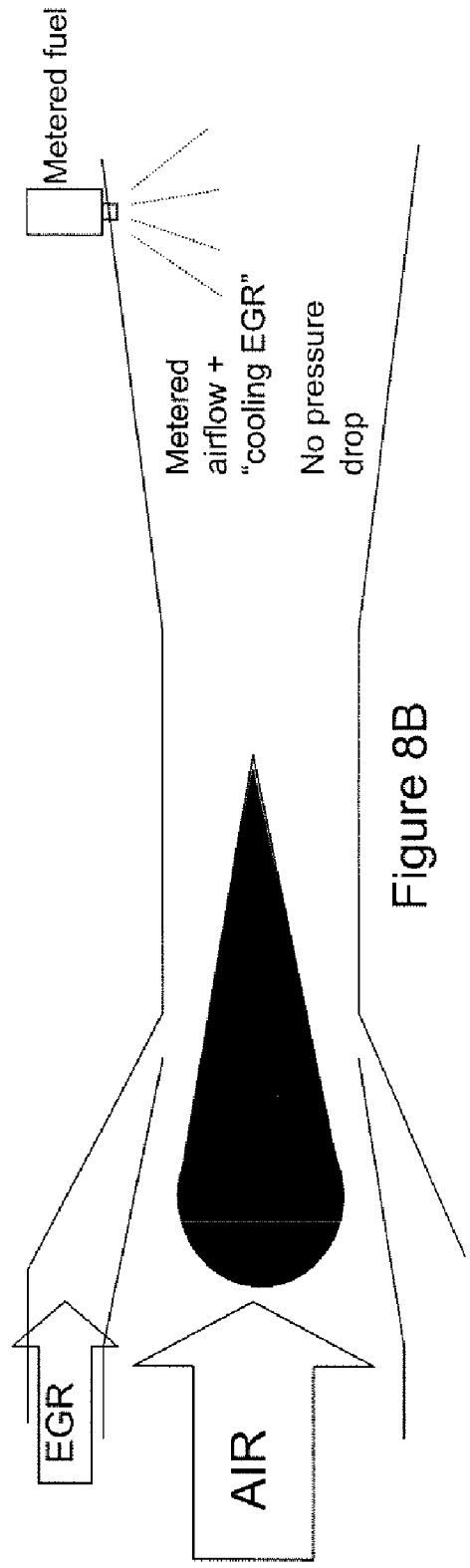
Figure 8A (prior art)
Figure 8B

US 7,426,923 B2

EXHAUST GAS RECIRCULATION SYSTEM FOR GASOLINE ENGINES

FIELD OF THE INVENTION

The present invention relates generally to exhaust gas recirculation in internal combustion engines, and more particularly to an exhaust gas recirculation system particularly adapted for use with gasoline fueled engines.

BACKGROUND OF THE INVENTION

As a result of expected stricter legislation concerning the levels of nitrogen oxides (NOx) in exhaust gases from diesel engines, extensive development is currently being carried out worldwide to produce a system for the cleaning of exhaust gases and reduction of NOx levels in such diesel engines. Much of the development effort is focused on exhaust gas cleaning technology in turbocharged diesel engines for use in heavy-duty (i.e., on road) applications (e.g., heavy duty truck engines).

Several solutions have been suggested, including catalysis processes which include several subprocesses (for example, injection of water, addition of urea) that in addition to being expensive also involve disadvantages in the form of complex and space-demanding components. The EGR (exhaust gas recirculation) concept has attracted interest since it not only has advantages from the point of view of expense but also is expected to offer safe functioning and simple and compact construction.

During the turbocharging of heavy diesel engines that takes place when in operation, the pressure of the exhaust gases in most cases is less than the inlet pressure, and exhaust gases can therefore not be recirculated without measures being taken for achieving a sufficient supply of exhaust gases. Such measures may take the form of, for example, venturi solutions, exhaust throttles or inlet throttles. However, these solutions have up until now been associated with disadvantages in the form of, for example, reduced engine power through high pressure losses, together with increased fuel consumption and smoke development.

By placing a venturi in the inlet flow, an advantageous difference in pressure between the exhaust channel side and the inlet channel side is achieved locally in the venturi, and exhaust gases, which are removed upstream of the turbo, can be fed into the inlet pipe of the engine. A reduced NOx level is obtained as a result of the resulting lower combustion temperature.

U.S. Pat. No. 5,333,456 (Bollinger) discloses a flow valve in the form of a coil that is placed upstream in the EGR supply flow. This control valve is not configured in a way which would allow it to be used in the inlet channels of turbocharged engines.

U.S. Pat. No. 5,611,203 (Henderson, et al.) discloses a flow regulator with venturi function which is disposed in the inlet channel next to the EGR supply flow. The opening for supply of exhaust gases is not located where the throttling of fresh air is greatest, which would involve a more severe throttling than necessary, while the total pressure losses, which arise from, for example, the neighboring actuator, become significant.

The publication SAE 2000 World Congress, SAE Technical Paper Series 2000-01-0225 discloses a variable venturi with axial EGR supply. The design does not display a proper venturi shape since the fresh air is exposed to a momentary increase in area at the end of the injector pipe, and therefore pressure losses can be significant. The component must be equipped with an elbow, with its associated pressure losses, as a result of the axial supply. Moreover, the dimensions of the component are unnecessarily bulky, which is also disadvantageous. The arrangement is primarily intended for measurement purposes and has no interest with respect to normal operating conditions.

The afore-mentioned U.S. patent application Ser. No. 10/363,350, filed Jul. 7, 2003, which is hereby incorporated by reference in its entirety, obviates these problems associated with the above-described prior art by providing an EGR system which includes a streamlined body arranged to be displaced in the longitudinal direction of a line at the inlet thereof. The body allows for achievement of a variable venturi effect and in this way a variable suction effect and mixture of the mixed flow. The system also includes an actuator for displacing the body forwards and backwards in the line.

While the EGR system disclosed in U.S. patent application Ser. No. 10/363,350 provides excellent results in connection with diesel engines, the application does not address use of the device disclosed therein in connection with gasoline engines, which engines exhibit performance characteristics and associated problems not encountered in diesel engines. One of the distinctions between gasoline and diesel engines is that gasoline engines control power output with a throttle which generally decreases engine efficiency, while diesel engines do not have a throttle. Another distinction is that gasoline engines have knock problems when one attempts to increase efficiency (i.e., by raising compression ratio, advancing timing, etc.); diesel engines do have such knock problems. A further distinction is that gasoline engines rely on three-way catalytic converters (three-way referring to the treating of three emissions: nitrogen oxides, hydrocarbons and carbon monoxide) for emission reduction, which catalysts do not work during cold start or during rich running conditions, while diesel engines do not use such three-way catalysts. Yet another distinction is that gasoline engines produce emissions of hydrocarbons (HC), carbon monoxide (CO) and NOx, while diesel engines do not emit any significant amount of HC or CO (but much more NOx and particulates).

While attempts have been made to employ EGR systems in connection with gasoline engines, such attempts have generally met with limited success and have focused only on reducing NOx (which as described above is more of a concern with respect to diesel engines than with respect to modern gasoline engines), rather than addressing problems facing gasoline engines. Such deficient attempts are disclosed in U.S. Pat. No. 4,174,027 (Nakazumi) and U.S. Pat. No. 4,224,912 (Tanaka). However, since the use of catalytic converters in connection with gasoline engines became popular, few if any attempts have been made to employ EGR systems in connection with gasoline engines (since conventional wisdom has always been that EGR systems are only useful for reducing NOx, and since the catalytic converters dealt with NOx reduction so well that additional NOx reducing measures were not necessary).

The publication SAE Technical Paper Series 982476, titled "Knock Suppression in a Turbocharged SI Engine by Using Cooled EGR", discloses that due to the high power density of turbo-charged engines, knocking combustion and high exhaust gas temperatures constitutes a problem at high loads. The reference also teaches that in order to reduce the gas temperature and to suppress knock, excessive amounts of fuel have traditionally been used. The references teaches that knock suppression and cooler exhaust gas temperatures can be achieved by using cooled EGR systems in connection with turbo-charged gasoline engines, rather than the traditional employment of excessive amounts of fuel. The publications SAE Technical Paper Series 1999-01-3505, titled "Replacing Fuel Enrichment in a Turbo Charged SI Engine: Lean Burn or Cooled EGR", and SAE Technical Paper Series 2003-01-0629, titled "Dilution Interest on Turbocharged SI Engine Combustion" disclose similar subject matter.

The publication SAE Technical Paper Series 970505, titled "Comparing Lean Burn and EGR", compares the technique of lean burn with that of EGR, and determines that fuel consumption is almost as good employing EGR as it is with lean combustion. The publication SAE Technical Paper Series 961953, titled "A Strategy to Improve the Efficiency of Stoichiometric Spark Ignition Engines", discloses that EGR as a knock reducing mean makes advanced ignition and higher compression possible. This increases engine efficiency across the complete engine load range. Furthermore, pumping losses are reduced on part load because of higher manifold pressure. The publication SAE Technical Paper Series 950684, titled "Improving NOx and Fuel Economy doe Mixture Injected SI Engine with EGR", discloses a gasoline engine employing an EGR system in which a mechanically driven mixture injection valve and a small mixture chamber are provided into the cylinder head in order to create a stratified mixture of up to 50% EGR along with combustion air.

While the six publications described in the two preceding paragraphs do recognize some potential benefits of using EGR in connection with gasoline engines, none of the references discloses an efficient and/or effective way for introducing EGR and/or mixing EGR with air before the mixture is combusted. Moreover, the references recognize only some of the benefits achievable with employing an EGR system with a gasoline engine.

The applicants of U.S. patent application Ser. No. 10/363,350, now U.S. Pat. No. 7,036,529, have discovered that the EGR system disclosed therein provides new and unexpected results when employed in connection with gasoline engines, which results have not been attainable with any EGR system heretofore used in connection with gasoline engines.

SUMMARY OF THE INVENTION

One object of the present invention is to provide an EGR system which is particularly adapted to be employed with gasoline engines and which enhances the performance and efficiency thereof.

This and other objects are achieved in one embodiment of the present invention by the provision of an exhaust gas recirculation system adapted for use in connection with a gasoline engine, the exhaust gas recirculation system including an inlet air supply line, a recirculating exhaust gas supply line, and an output line. Air entering through the inlet air supply line and cooled exhaust gas entering though the recirculating exhaust gas supply line mix to create a mixture of air and cooled exhaust gas before exiting the output line. A body is actuatable to control a proportion of air versus recirculating cooled exhaust gas in the mixture, and a source of metered fuel is injected into the mixture. An actuator causes actuation of the body in order to vary the proportion of air versus recirculating cooled exhaust gas in the mixture so as to cause the combustion temperature to be reduced when the engine is operating under at least some engine conditions.

In some embodiments, the body comprises a valve body arranged to be displaced in a longitudinal direction within a channel in order to achieve a variable venturi effect and to control air mass flow and the proportion of air versus recirculating cooled exhaust gas in the mixture. In some embodiments, the actuator causes the recirculating cooled exhaust gas to be injected into the mixture in an amount such that the combustion temperature is reduced to a degree such that engine knock is reduced.

In some embodiments, the system is configured to selectively supply warm exhaust gas rather than cooled exhaust gas, the warm exhaust gas being mixed with the air to create a mixture of air and warm exhaust gas before exiting the output line, and the actuator causes actuation of the body in order to vary a proportion of air versus recirculating warm exhaust gas in the mixture so as to cause the engine to be warmed when the engine is operating under at least some engine conditions. In certain of these embodiments, the actuator causes the recirculating warm exhaust gas to be injected into the mixture in an amount such that the engine is quickly warmed during a cold start to minimize cold operating, thereby reducing related emissions. In certain embodiments, the actuator causes the recirculating warm exhaust gas to be injected into the mixture in an amount such that exhaust temperature is raised to a degree sufficient to rapidly ignite a three-way catalyst during a cold start.

In some embodiments, the recirculating cooled exhaust gas contains hydrocarbons, at least some of which are combusted during recirculation.

In accordance with another embodiment of the present invention, an exhaust gas recirculation system adapted for use in connection with a gasoline engine includes an inlet air supply line, a recirculating exhaust gas supply line, and an output line. Air entering through the inlet air supply line and warm exhaust gas entering though the recirculating exhaust gas supply line mix to create a mixture of air and warm exhaust gas before exiting the output line. A body is actuatable to control a proportion of air versus recirculating warm exhaust gas in the mixture, and a source of metered fuel is injected into the mixture. An actuator causes actuation of the body in order to vary the proportion of air versus recirculating warm exhaust gas in the mixture so as to cause the engine to be warmed when the engine is operating under at least some engine conditions.

In some embodiments, the body comprises a valve body arranged to be displaced in a longitudinal direction within a channel in order to achieve a variable venturi effect and to control air mass flow and the proportion of air versus recirculating warm exhaust gas in the mixture. In some embodiments, the actuator causes the recirculating warm exhaust gas to be injected into the mixture in an amount such that the engine is quickly warmed during a cold start to minimize cold operating, thereby reducing related emissions. In some embodiments, the actuator causes the recirculating warm exhaust gas to be injected into the mixture in an amount such that exhaust temperature is raised to a degree sufficient to ignite a three-way catalyst during a cold start.

In some embodiments, the system is configured to selectively supply cooled exhaust gas rather than warm exhaust gas, the cooled exhaust gas being mixed with the air to create a mixture of air and cooled exhaust gas before exiting the output line, and the actuator causes actuation of the body in order to vary a proportion of air versus recirculating cooled exhaust gas in the mixture so as to cause the combustion temperature to be reduced when the engine is operating under at least some engine conditions. In certain of these embodiments, the actuator causes the recirculating cooled exhaust gas to be injected into the mixture in an amount such that the combustion temperature is reduced to a degree such that engine knock is reduced.

In some embodiments, the recirculating warm exhaust gas contains hydrocarbons, at least some of which are combusted during recirculation.

In accordance with a further embodiment of the present invention, a gasoline engine system includes a gasoline engine, a throttle valve for metering a supply of combustion gas fed to the engine, and a source of metered fuel injected into the combustion gas mixture. The throttle valve comprises an inlet air supply line, a recirculating exhaust gas supply line, and an output line. Air entering through the inlet air supply line and exhaust gas entering though the recirculating exhaust gas supply line mix to create a combustion gas mixture of air and exhaust gas before exiting the output line. A body is actuatable to control a proportion of air versus recirculating exhaust gas in the combustion gas mixture.

In some embodiments, the body comprises a valve body arranged to be displaced in a longitudinal direction within a channel in order to achieve a variable venturi effect and to control air mass flow and the proportion of air versus recirculating exhaust gas in the combustion gas mixture. In some embodiments, the system is configured to selectively supply cooled exhaust gas, the cooled exhaust gas being mixed with the air to create a mixture of air and cooled exhaust gas before exiting the output line, and the system further comprises an actuator which causes actuation of the body in order to vary a proportion of air versus recirculating cooled exhaust gas in the mixture so as to cause the combustion temperature to be reduced when the engine is operating under at least some engine conditions. In certain of these embodiments, the actuator causes the recirculating cooled exhaust gas to be injected into the mixture in an amount such that the combustion temperature is reduced to a degree such that engine knock is reduced.

In some embodiments, the system is configured to selectively supply warm exhaust gas, the warm exhaust gas being mixed with the air to create a mixture of air and warm exhaust gas before exiting the output line, and the system further comprises an actuator which causes actuation of the body in order to vary a proportion of air versus recirculating warm exhaust gas in the mixture so as to cause the engine to be warmed when the engine is operating under at least some engine conditions. In certain of these embodiments, the actuator causes the recirculating warm exhaust gas to be injected into the mixture in an amount such that the engine is quickly warmed during a cold start to minimize cold operating, thereby reducing related emissions. In certain embodiments, the actuator causes the recirculating warm exhaust gas to be injected into the mixture in an amount such that exhaust temperature is raised to a degree sufficient to ignite a three-way catalyst during a cold start.

In some embodiments, the recirculating exhaust gas contains hydrocarbons, at least some of which are combusted during recirculation.

In accordance with a further embodiment of the present invention, an arrangement for mixing an inlet flow with an exhaust gas return flow in a gasoline engine comprises a line for the first flow; an inlet for the second flow in the line, in order to achieve the mixing; a streamlined body arranged to be displaced in a longitudinal direction of the line at the inlet in order to achieve a variable venturi effect and in this way a variable suction effect and mixture of the mixed flow; and an actuator for displacing the body forwards and backwards in the line; characterized in that the streamlined body and the line are designed to achieve maximal throttling in the line close to the inlet independently of the position of the body, in order to minimize the need for throttling and the accompanying pressure losses.

In some embodiments, the actuator is arranged inside of the body or outside of the line in order not to disturb the first flow and cause pressure losses in it. In some embodiments, the inlet is arranged around the cross-section of the line in order to maximize the suction effect and in this way minimize pressure losses. In certain of these embodiments, the inlet is designed in the form of a gap. In certain of these embodiments, the gap has a gap width that can be adjusted, such that the area of flow can be optimized for various mixture conditions with the aim of minimizing pressure losses.

In some embodiments, the streamlined body is suspended at the front end thereof by means of a holder that extends to one external surface of the line. In certain of these embodiments, the holder has a streamlined cross-section in order to minimize pressure losses. In certain embodiments, the holder, when the actuator is arranged either inside the body or outside of the line, comprises means for supplying energy to the actuator. In certain of these embodiments, the holder, when the actuator is arranged outside of the line, is constituted by a smooth rod arranged to slide on bearings in a bore in the outer wall of the line, threaded or executed as a ball screw.

The invention and its particular features and advantages will become more apparent from the following detailed description considered with reference to the accompanying drawings.

BRIEF DESCRIPTION OF THE DRAWINGS

FIGS. 6A and 6B are schematic side views comparing operation of a typical throttle with operation the EGR system of FIG. 1 at low engine loads;

FIGS. 7A and 7B are schematic side views comparing operation of a typical throttle with operation the EGR system of FIG. 1 at moderate engine loads; and FIGS. 8A and 8B are schematic side views comparing operation of a typical throttle with operation the EGR system of FIG. 1 at full engine loads.

DETAILED DESCRIPTION OF AN EMBODIMENT OF THE INVENTION

Figure 1:
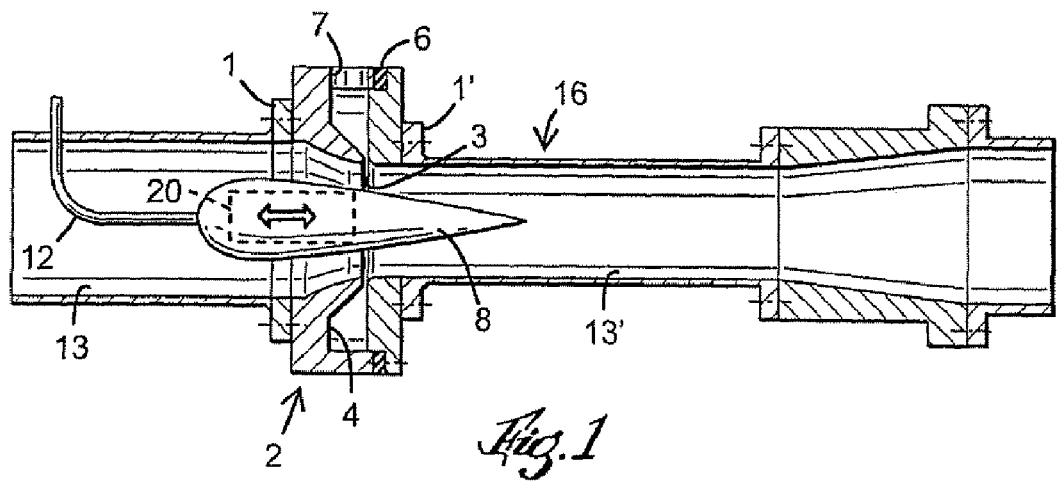
FIG. 1 is a partially cross-sectional side view of an EGR system in accordance with an embodiment of the present invention.

The EGR system of the present invention is particularly well-suited to be used in conjunction with gasoline engines. One of the main differences between traditional gasoline engines and diesel engines is in the preparation of the combustible charge (i.e., the mixture of air and/or other gasses and fuel). The traditional gasoline engine mixes fuel and air outside the cylinder (i.e., in the carburetor or fuel injection system), creating a homogenous charge, where the relationship between air mass and fuel mass is controlled. The mass ratio is fixed so that all fuel and all oxygen is consumed during combustion. Therefore, to run the engine on part load, both air and fuel supply must be limited (i.e., throttled). While it is true that some modern gasoline engines are being developed in which the fuel is injected directly into the cylinder, such injection is generally done very early in the combustion cycle, such that the problem with knock is still present. Use of the EGR system of the present invention in connection with these types of engines is also advantageous.

This is not the case with the diesel engine, which mixes fuel and air inside the cylinder, resulting in an inhomogeneous charge and a diffusing flame where only the injected amount of fuel must be metered in order to control power output. Hence, since the diesel engine does not require that air supply be metered, it has no need for a throttle (as opposed to the gasoline engine).

Throttling the intake on a gasoline engine requires the engine to pump gases through the throttle. This pumping work is simply wasted, resulting in lower efficiency compared to diesel engines. Another problem with premixed charges is that the charge is combustible during engine compression (as compared to a diesel engine, in which only air is compressed with fuel being injected later). When compressing a gas, the temperature rises, and since fuel is present, the homogeneous charge can auto ignite, resulting in uncontrolled combustion (i.e., engine knock) and engine damage. This problem is exacerbated on turbocharged gasoline engines, where there is more, and a hotter, charge present.

Currently, emission legislation for passenger vehicles is limited to part load operation, while preventing knock is generally a concern only at higher loads. Thus, engine manufacturers have chosen to address the knock problem by retarding ignition (resulting in low thermal efficiency) and cooling the combustion with additional fuel (i.e., an amount over and above the amount needed for combustion). As such, up to 30% of the injected fuel is not consumed during combustion, but only serves as a cooling medium inside the cylinder. This is true because excess fuel cannot be combusted since all oxygen is already consumed with the "original amount" of fuel. The result is high emissions of hydrocarbons (i.e., uncombusted fuel), and even lower engine efficiency. This is not of concern under current emission legislation, since as mentioned above, emissions are only limited while the engine is operating at part load conditions (which are not the conditions when measures are taken to reduce engine knock) and fuel consumption is simply still not an important matter to consumers as a whole. However, this is likely to change—emission legislation for passenger vehicles is likely to become much stricter in the near future, and fuel prices are increasing rapidly. In order to raise efficiency, turbocharging will likely be used to a much larger extent in future passenger vehicles, and alternatives to simply adding additional fuel to cool combustion temperature will be sought.

Embodiments of the invention will be described in the following text as preferred embodiments in association with exhaust gas recirculation of a turbocharged gasoline engine. The invention, however, is not limited to this, but can be also used in connection with other types of gasoline engines.

In the preferred application, an EGR supply flow is introduced radially via a supply part 2 in an inlet channel or pipeline generally denoted by 16 from a turbocharger that is not shown.

The supply part 2 is inserted between flanges 1, 1' of a pair of pipe sections 13 and 13' in the line 16. The supply part 2 forms a flow regulator together with the streamlined body 8 described below. On the basis of the designs of the streamlined body 8 and the supply part 2, the greatest throttling of fresh air is always achieved at the gap 3 for exhaust gas introduction, independently of the position of the body 8. In the embodiment shown, the supply part 2 is designed with a cross-sectional area that decreases up to the slit in the direction of flow in the line 16 for this purpose. This reduction in the cross-sectional area of the supply part 2 is, furthermore, greater than the reduction in the cross-sectional area of the streamlined body 8 downstream of its greatest cross-sectional area in the direction of flow in the line 16. In the active diffuser region downstream of the slit 3, the pipeline 16 has, in the embodiment shown, a constant cross-sectional area, while the cross-sectional area of the streamlined body 8 continues to decrease in this region. The actuator 20 is arranged such that the greatest cross-sectional area of the streamlined body 8 is never displaced downstream of the slit 3.

The ring-shaped channel that is limited between the supply part 2 and the streamlined body 8 thus always has a convergent course in the direction of flow up to the slit 3 and a divergent course after the slit 3 independently of the position of the body 8.

Supply flow preferably occurs via a continuous circular slit 3 through the supply part 2, which in this case is in two parts, but it can also be achieved via a number of holes or slits around the perimeter (not shown).

Even if the supply occurs radially, the direction of the supply at the inlet 7 of the supply part 2 can be selected to lie at such an angle that the desired flow conditions and the least possible flow losses can be achieved when mixing the two gases.

By maximizing the throttling of fresh air at the inlet of exhaust gases 3 according to the invention, the greatest possible pump effect is also achieved, that is, the solution involves very small pressure losses. As a consequence of the free flow of air around the present streamlined body 8, which displays a venturi effect in itself, deterioration of the power of the engine is avoided in the same way while good regulation of the EGR supply is achieved.

A continuous, cylindrical cavity 4 exists around the gap 3. A gasket 6 is placed between the two parts of the supply part. The desired gap distance in the opening 3 can be achieved by selecting the thickness of the gasket 6. A supply pipe for the EGR supply flow can be mounted in a manner that is not shown at the inlet 7 of the supply part 2 from an extension of a manifold for the exit exhaust gases of the engine.

The input air is cooled in the conventional manner downstream of the turbocharger by an intercooler that is not shown, and the EGR gases are cooled in the same way via a separate EGR cooler before supply into the inlet channel. The flow regulator can be placed at a freely chosen location downstream of the turbocharger. However, the flow regulator is preferably located downstream of the intercooler to prevent the latter from being contaminated with soot or being corroded by the acidic exhaust gases.

The streamlined body 8 is freely suspended within the supply part 2 by means of a holder 12 that extends from the front edge of the body 8 and outwards into the pipe section 16. The actuator 20 for displacement of the body 8 forwards and backwards relative to the supply part 2 can, according to the invention, be arranged either within the body 8 or outside of the line 16.

Figure 2:
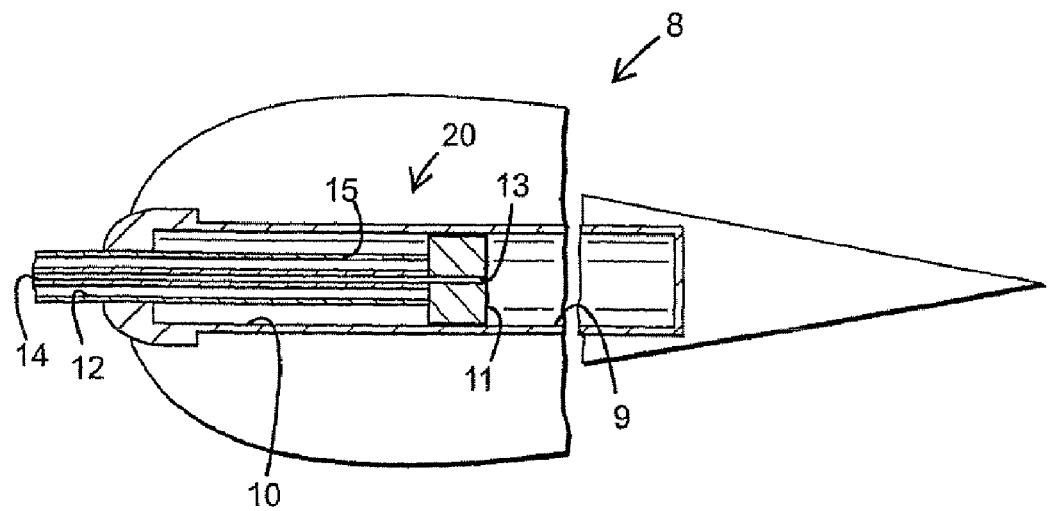
FIG. 2 is a partially cross-sectional side view of an embodiment of a streamlined body portion with its integrated fluid-controlled actuator of the EGR system of FIG. 1.

In the embodiment according to FIGS. 1 and 2, the holder 12 is attached to the outer wall of the pipe section 13 and comprises a feed pipe 12 for regulation of the actuator 20.

The actuator 20 can be regulated by hydraulic means or through a gaseous fluid, preferably pressurized air that is available on commercial vehicles through the braking system. The actuator 20 is integrated with the body 8, that is, it is located inside of it. A cylinder 9 is placed inside the body, which cylinder 9 exits through a sealing to the feed pipe 12 of the forward portion of the part of the body 8 with greatest cross-sectional area or with least cross-sectional area, preferably the forward external surface of the part with greatest cross-sectional area. The feed pipe 12 contains an additional smaller feed pipe 14. A spring element, not shown, can be attached against the wall of the cylinder 9 that is placed furthest away from the feed pipe, which spring element influences a piston 11 placed at the end of the feed pipe 12. The piston in turn is equipped with a channel 13 opening at one free end of the piston 11. The perimeter hole 10, along the channel part, which can also contain a spring element, not shown, placed between the piston and the wall of the cylinder placed closest to the feed pipe 12, is equipped with an opening 15 into the feed pipe 12 at the second end of the piston. Thus the streamlined body 8 attached to the cylinder 9 can be displaced forwards and backwards relative to the gap 3 within the supply part 2 by variation of the fluid pressure in, on the one hand, the feed pipe 12 and, on the other hand, the smaller feed pipe 14.

A particularly simple and robust construction of the flow regulator is achieved by integrating the actuator 20 with the body 8, as has been shown by the above description.

Figure 3:
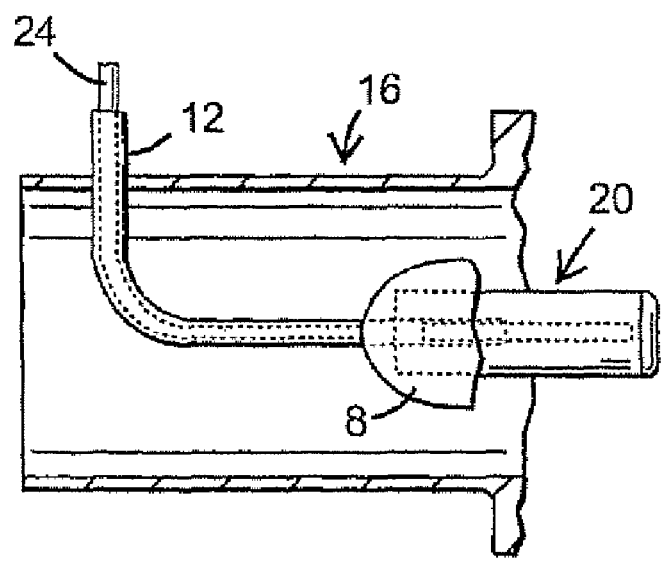
FIG. 3 is a partially cross-sectional side view showing in greater detail an embodiment of the integrated actuator for the streamlined body portion of the EGR system of FIG. 1.
Figure 4:
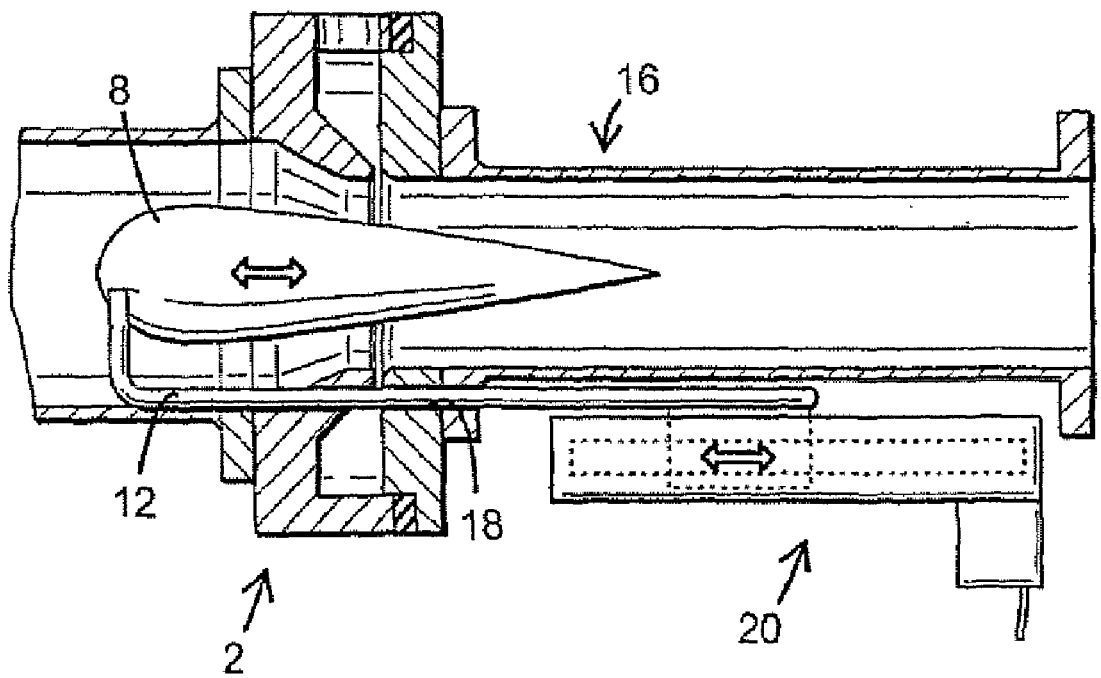
FIG. 4 is a partially cross-sectional side view showing in greater detail an embodiment of a flow regulator portion with an external actuator which may be employed by the EGR system of FIG. 1.
Figure 5:
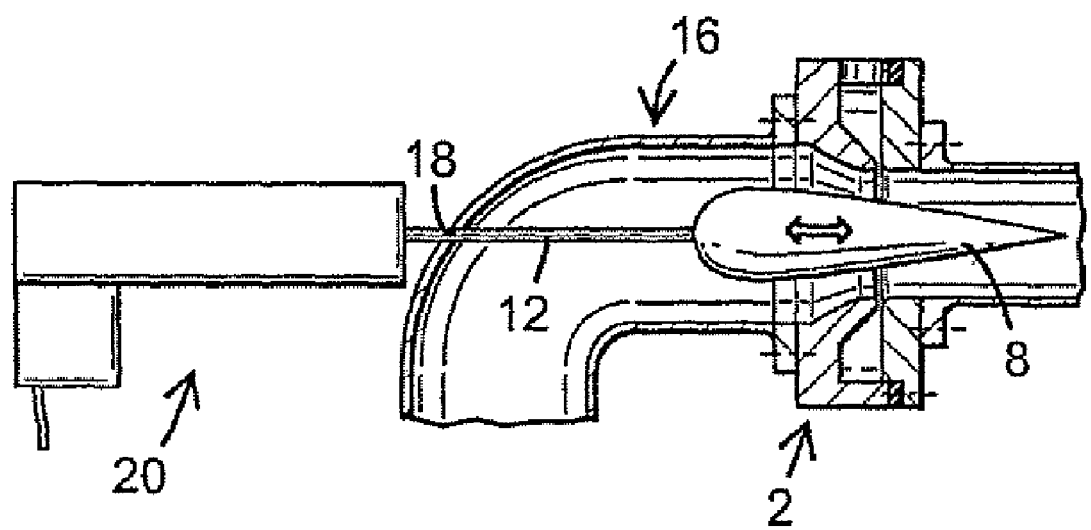
FIG. 5 is a partially cross-sectional side view showing in greater detail another embodiment of a flow regulator portion with an external actuator which may be employed by the EGR system of FIG. 1.

The actuator 20 can, as is suggested in FIGS. 3, 4 and 5, be of a general type. The actuator can be, in addition to hydraulic or pneumatic, electromechanical, with power supplied through a cable 24 in the holder 12 (FIG. 3) and an electrical motor or solenoid built into the body. It can also be purely mechanical if, for example, the cable 24 is replaced by a Bowden cable that displaces the body 8 forwards and backwards along the axial section of the holder 12 via an external actuator 20 against the force of a return spring (not shown) inside the body 8.

Two embodiments of the actuator placed outside of the line 16 are shown in FIGS. 4 and 5. According to FIG. 4, the holder extends at an angle downstream through a bore 18 in the supply part 2. According to FIG. 5, the holder extends in a straight line through the bore 18, which in this case is located at a bend in the line 16. The holder 12 can be executed as a rod, mounted in bearings to slide in the bore 18. The holder may also be threaded or executed as a ball screw, alternatively having the corresponding inner thread in body 8 or bore 18, whereby only rotating motion needs to be achieved outside of the pipe 16.

That part of the holder 12 that extends across the flow in the line 16 can, as is suggested in FIG. 3, have an extended streamlined cross-section in order to minimize pressure losses in the line 16.

Thus, lower pressure losses in the pipeline arising from the disturbing affects of, for example, an actuator placed inside the channel are achieved, compared with earlier known designs, through the integrated actuator or the actuator placed outside of the pipeline according to the invention.

In contrast to earlier technology, employing, among other things, valve-like venturi solutions in the form of a combination of a displaceable coil-formed body and a fixed venturi part, it has been possible to eliminate to a major extent pressure losses in the inlet air according to the present invention.

By employing the EGR system of the present invention, many, if not all, of the above-described problems can be avoided.

With respect to engine knock control and combustion temperature cooling, for higher loads cooling the charge with cooled EGR instead of fuel results in both substantially lower fuel consumption and emissions. In addition, the cooling effect from EGR can be higher compared to the effect from excess fuel (since EGR does not have to be employed as sparingly as does excess fuel)—lower temperature means lower risk for knock. Moreover, the existence of lower residual gases, due to lower exhaust pressure (since some exhaust gases do not have to pass a choked turbine) means lower temperature, and therefore lower risk for knock. In turn, lower risk for knock means that the compression ratio can be raised, resulting in higher engine thermal efficiency, and that ignition can be advanced, resulting in higher engine thermal efficiency. Cooler combustion (and exhaust gases) means longer life for the turbocharger and manifold.

With respect to minimizing throttling, instead of throttling the intake on part load (which equates to wasting energy), one may mix cooled EGR with the intake charge. For a specific power output there must be a certain amount of air and fuel present (since as discussed above there is a homogeneous charge). There could also be substantial amounts of EGR, resulting in less need for throttling. The variable venturi of the present invention may be partially closed allowing a limited (i.e., a metered) amount of air to pass, just like a throttle. At the same time it allows EGR to mix with the charge resulting in high inlet pressure and minimized pressure drop. This leads to higher engine efficiency. Note that this can be done also with any throttle. However the venturi's low pressure drop and large variability make it out perform the common throttle on high engine loads.

The above is shown schematically in FIGS. 6A - 8B. With respect to FIGS. 6A and 6B, flow is shown through a standard throttle (FIG. 6A) and in the case where the EGR system of the present invention has been employed instead of a standard throttle (FIG. 6B) when the engine is operating at low engine load. In the case of a standard throttle, metered airflow is achieved at a very low pressure (meaning that there is a high pressure drop across the throttle, resulting in low engine efficiency). On the other hand, in the case where the standard throttle has been replaced by the EGR system of the present invention, metered airflow is achieved with high EGR at a higher pressure (meaning that there is a lower pressure drop across the venturi, resulting in higher engine efficiency). FIGS. 7A and 7B, show the same arrangement when the engine is operating at moderate engine load. In the case of a standard throttle (FIG. 7A), metered airflow is achieved with no significant pressure drop (resulting in high engine efficiency), and emission is controlled with a catalyst. On the other hand, in the case where the standard throttle has been replaced by the EGR system of the present invention (FIG. 7B), metered airflow is achieved with low EGR rates at a higher pressure (resulting in the same higher engine efficiency), and emission is controlled by both the catalyst and the EGR system (i.e., partial recirculation of gases). FIGS. 8A and 8B, show the same arrangement when the engine is operating at full engine load (i.e., with turbocharger engaged). In the case of a standard throttle (FIG. 8A), metered airflow is achieved with no pressure drop. However, excess fuel is injected to act as a combustion temperature coolant, and therefore engine efficiency is poor and hydrocarbon emissions are high. On the other hand, in the case where the standard throttle has been replaced by the EGR system of the present invention (FIG. 8B), metered airflow is achieved with significant EGR rates (so that the EGR acts as the combustion temperature coolant rather than excess fuel) and no pressure drop. This results in high engine efficiency and low emissions, since no excess fuel is required to act as a combustion temperature coolant. Of course, it should be noted that the EGR system of the present invention provides benefits when used in conjunction with substantially any type of gasoline engine, not only turbo-charged engines (although in many cases, turbo-charged engines benefit the most from use of the EGR system of the present invention).

Thus, as can be seen, operating the gasoline engine employing the EGR system of the present invention rather than a standard throttle provides distinct advantages under all three operating conditions (i.e., low engine load, moderate engine load, and full engine load).

Another benefit of employing the EGR system of the present invention relates to emission reduction. In addition to the above problems concerning HC emissions, an additional problem relates to the fact that due to throttle operation, altering pressure in the inlet manifold creates "wet walls" and resulting vaporization from time to time, and premixed charge present in cold crevices inside the combustion chamber. By employing EGR, exhaust gases will be "recombusted," thereby burning residual hydrocarbons. In addition, EGR use in conjunction with gasoline engines has a NOx reducing effect similar to that described above in connection with diesel engines, although to a lesser extent (since gasoline engines have less of a NOx problem as compared to diesel engines). Furthermore, large (preferably non-cooled) amounts of EGR may be used to warm up the engine quickly during cold start to minimize cold operating (and thereby related emissions). Also, very large amounts of EGR may be used to raise exhaust temperature, which may be used during cold start to ignite the three-way catalyst (since before catalyst ignition occurs, a gasoline engine has no working emission reduction system).

Employing the EGR system of the present invention in conjunction with a gasoline engine presents some additional control possibilities which are not an option in diesel engines. For example, because one of the major benefits of using the EGR system of the present invention in conjunction with gasoline engines concerns the prevention of engine knock, it is possible to provide the system with a knock sensor and then to control the EGR system based at least in part upon sensed knock. Because engine knock can damage or destroy an engine extremely quickly, and because reducing/eliminating engine knock via EGR control may not be quick enough to avoid engine damage, it is most preferable that knock prevention/reduction be achieved by a combination of ignition timing control (which can be changed quickly, e.g., from one engine cycle to another) and EGR-rate control.

In view of the above, it should be clear to those skilled in the art that the present invention provides an EGR system which is particularly adapted to be employed with gasoline engines and which enhances the performance and efficiency thereof.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An exhaust gas recirculation system adapted for use in connection with a gasoline engine, said exhaust gas recirculation system comprising:
    an inlet air supply line, a recirculating exhaust gas supply line, and an output line, air entering through said inlet air supply line and cooled exhaust gas entering though said recirculating exhaust gas supply line mixing to create a mixture of air and cooled exhaust gas before exiting said output line;
    a body actuatable to control a proportion of air versus recirculating cooled exhaust gas in the mixture;
    a source of metered fuel injected into the mixture; and
    an actuator which causes actuation of said body in order to vary the proportion of air versus recirculating cooled exhaust gas in the mixture so as to cause a combustion temperature of said engine to be reduced when said engine is operating under at least some engine conditions.

2. The system of claim 1 wherein said actuator causes the recirculating cooled exhaust gas to be injected into the mixture in an amount such that said combustion temperature is reduced to a degree such that engine knock is reduced.

3. The system of claim 1 wherein the recirculating cooled exhaust gas contains hydrocarbons, at least some of which are combusted during recirculation.

4. The system of claim 1 wherein said body comprises a valve body arranged to be displaced in a longitudinal direction within a channel in order to achieve a variable venturi effect and to control air mass flow and the proportion of air versus recirculating cooled exhaust gas in the mixture.

5. The system of claim 4 wherein the variable venturi effect ensures minimal losses across said body.

6. The system of claim 1 wherein said system is configured to selectively supply warm exhaust gas rather than cooled exhaust gas, the warm exhaust gas being mixed with the air to create a mixture of air and warm exhaust gas before exiting said output line, and wherein said actuator causes actuation of the body in order to vary a proportion of air versus recirculating warm exhaust gas in the mixture so as to cause the engine to be warmed when the engine is operating under at least some engine conditions.

7. The system of claim 6 wherein said actuator causes the recirculating warm exhaust gas to be injected into the mixture in an amount such that said engine is quickly warmed during a cold start to minimize cold operating, thereby reducing related emissions.

8. The system of claim 6 wherein said actuator causes the recirculating warm exhaust gas to be injected into the mixture in an amount such that exhaust temperature is raised to a degree sufficient to ignite a three-way catalyst during a cold start.

9. An exhaust gas recirculation system adapted for use in connection with a gasoline engine, said exhaust gas recirculation system comprising:
    an inlet air supply line, a recirculating exhaust gas supply line, and an output line, air entering through the inlet air supply line and warm exhaust gas entering though the recirculating exhaust gas supply line mixing to create a mixture of air and warm exhaust gas before exiting the output line;
    a body actuatable to control a proportion of air versus recirculating warm exhaust gas in the mixture;
    a source of metered fuel injected into the mixture; and
    an actuator which causes actuation of the body in order to vary the proportion of air versus recirculating warm exhaust gas in the mixture so as to cause the engine to be warmed when the engine is operating under at least some engine conditions.

10. The system of claim 9 wherein said body comprises a valve body arranged to be displaced in a longitudinal direction within a channel in order to achieve a variable venturi effect and to control air mass flow and the proportion of air versus recirculating warm exhaust gas in the mixture.

11. The system of claim 9 wherein said actuator causes the recirculating warm exhaust gas to be injected into the mixture in an amount such that said engine is quickly warmed during a cold start to minimize cold operating, thereby reducing related emissions.

12. The system of claim 9 wherein said actuator causes the recirculating warm exhaust gas to be injected into the mixture in an amount such that exhaust temperature is raised to a degree sufficient to ignite a three-way catalyst during a cold start.

13. The system of claim 9 wherein the recirculating warm exhaust gas contains hydrocarbons, at least some of which are combusted during recirculation.

14. The system of claim 9 wherein said system is configured to selectively supply cooled exhaust gas rather than warm exhaust gas, the cooled exhaust gas being mixed with the air to create a mixture of air and cooled exhaust gas before exiting said output line, and wherein said actuator causes actuation of the body in order to vary a proportion of air versus recirculating cooled exhaust gas in the mixture so as to cause a combustion temperature of said engine to be reduced when said engine is operating under at least some engine conditions.

15. The system of claim 14 wherein said actuator causes the recirculating cooled exhaust gas to be injected into the mixture in an amount such that said combustion temperature is reduced to a degree such that engine knock is reduced.

16. A gasoline engine system comprising:
a gasoline engine;
a throttle valve for metering a supply of combustion gas fed to the engine, said throttle valve comprising:
an inlet air supply line, a recirculating exhaust gas supply line, and an output line, air entering through the inlet air supply line and exhaust gas entering though the recirculating exhaust gas supply line mixing to create a combustion gas mixture of air and exhaust gas before exiting the output line;
a body actuatable to control a proportion of air versus recirculating exhaust gas in the combustion gas mixture; and
a source of metered fuel injected into the combustion gas mixture.

17. The system of claim 16 wherein the recirculating exhaust gas contains hydrocarbons, at least some of which are combusted during recirculation.

18. The system of claim 16 wherein said body comprises a valve body arranged to be displaced in a longitudinal direction within a channel in order to achieve a variable venturi effect and to control air mass flow and the proportion of air versus recirculating exhaust gas in the combustion gas mixture.

19. The system of claim 18 wherein the variable venturi effect ensures minimal losses across said body.

20. The system of claim 16 wherein said system is configured to selectively supply cooled exhaust gas, the cooled exhaust gas being mixed with the air to create a mixture of air and cooled exhaust gas before exiting said output line, and further comprising an actuator which causes actuation of the body in order to vary a proportion of air versus recirculating cooled exhaust gas in the mixture so as to cause a combustion temperature of said engine to be reduced when said engine is operating under at least some engine conditions.

21. The system of claim 20 wherein said actuator causes the recirculating cooled exhaust gas to be injected into the mixture in an amount such that said combustion temperature is reduced to a degree such that engine knock is reduced.

22. The system of claim 16 wherein said system is configured to selectively supply warm exhaust gas, the warm exhaust gas being mixed with the air to create a mixture of air and warm exhaust gas before exiting said output line, and further comprising an actuator which causes actuation of the body in order to vary a proportion of air versus recirculating warm exhaust gas in the mixture so as to cause the engine to be warmed when the engine is operating under at least some engine conditions.

23. The system of claim 22 wherein said actuator causes the recirculating warm exhaust gas to be injected into the mixture in an amount such that said engine is quickly warmed during a cold start to minimize cold operating, thereby reducing related emissions.

24. The system of claim 22 wherein said actuator causes the recirculating warm exhaust gas to be injected into the mixture in an amount such that exhaust temperature is raised to a degree sufficient to ignite a three-way catalyst during a cold start.

25. An arrangement for mixing an inlet flow with an exhaust gas return flow in a gasoline engine, comprising a line for the first flow; an inlet for the second flow in the line, in order to achieve the mixing; a streamlined body arranged to be displaced in a longitudinal direction of the line at the inlet in order to achieve a variable venturi effect and in this way a variable suction effect and mixture of the mixed flow; and an actuator for displacing the body forwards and backwards in the line; characterized in that the streamlined body and the line are designed to achieve maximal throttling in the line close to the inlet independently of the position of the body, in order to minimize the need for throttling and accompanying pressure losses; and further comprising a source of metered fuel injected into the mixed flow.

26. The arrangement according to claim 25, characterized in that the actuator is arranged inside of the body or outside of the line in order not to disturb the first flow and cause pressure losses in it.

27. The arrangement according to claim 25, characterized in that the inlet is arranged around the cross-section of the line in order to maximize the suction effect and in this way minimize pressure losses.

28. The arrangement according to claim 27, characterized in that the inlet is designed in the form of a gap.

29. The arrangement according to claim 28, characterized in that the gap has a gap width that can be adjusted, such that the area of flow can be optimized for various mixture conditions with the aim of minimizing pressure losses.

30. The arrangement according to claim 25, characterized in that the streamlined body is suspended at the front end thereof by means of a holder that extends to one external surface of the line.

31. The arrangement according to claim 30, characterized in that the holder, when the actuator is arranged either inside the body or outside of the line, comprises means for supplying energy to the actuator.

32. The arrangement according to claim 30, characterized in that the holder has a streamlined cross-section in order to minimize pressure losses.

33. The arrangement according to claim 32, characterized in that the holder, when the actuator is arranged outside of the line, is constituted by a smooth rod arranged to slide on bearings in a bore in the outer wall of the line, threaded or executed as a ball screw.

* * * * *